(12) United States Patent
Schepers et al.

(10) Patent No.: US 12,246,286 B2
(45) Date of Patent: Mar. 11, 2025

(54) ELECTRICALLY HEATABLE CATALYTIC CONVERTER

(71) Applicant: Vitesco Technologies GMBH, Regensburg (DE)

(72) Inventors: Sven Schepers, Troisdorf (DE); Peter Hirth, Rösrath (DE); Thomas Härig, Neunkirchen-Seelscheid (DE)

(73) Assignee: Vitesco Technologies GmbH, Regensburg (DE)

( * ) Notice: Subject to any disclaimer, the term of this patent is extended or adjusted under 35 U.S.C. 154(b) by 493 days.

(21) Appl. No.: 17/668,762

(22) Filed: Feb. 10, 2022

(65) Prior Publication Data

US 2022/0161190 A1 May 26, 2022

Related U.S. Application Data

(63) Continuation of application No. PCT/EP2020/072150, filed on Aug. 6, 2020.

(30) Foreign Application Priority Data

Aug. 13, 2019 (DE) ...................... 10 2019 212 133.0

(51) Int. Cl.
 *B01D 53/94* (2006.01)
 *B01J 35/56* (2024.01)
 (Continued)

(52) U.S. Cl.
 CPC .............. *B01D 53/94* (2013.01); *B01J 35/56* (2024.01); *H05B 3/08* (2013.01); *H05B 3/10* (2013.01);
 (Continued)

(58) Field of Classification Search
 CPC .. B01D 53/94; B01D 2255/9155; B01J 35/56; H05B 3/08; H05B 3/10;
 (Continued)

(56) References Cited

U.S. PATENT DOCUMENTS 5,140,812 A 8/1992 Cornelison
5,177,961 A * 1/1993 Whittenberger ...... F01N 3/2892
422/174

(Continued)

FOREIGN PATENT DOCUMENTS

CN 104364483 A 2/2015
DE 4306482 A1 9/1993
(Continued)

OTHER PUBLICATIONS

Machine Translation WO 2019/053250 (Year: 2024).*
(Continued)

*Primary Examiner* — Dapinder Singh

(57) ABSTRACT

An electrically heatable catalytic converter with a metal honeycomb body, the honeycomb body being formed by a plurality of wound metal foils and the honeycomb body being received in a casing tube, a device for electrically contacting at least individual foils being led into the casing tube through an opening in the casing tube, the device being formed by an electrode which is electrically insulated from the inside of the casing tube by a connecting layer and mechanically connected to the casing tube.

10 Claims, 1 Drawing Sheet

(51) Int. Cl.
  *H05B 3/08* (2006.01)
  *H05B 3/10* (2006.01)
(52) U.S. Cl.
  CPC .............. *B01D 2255/9155* (2013.01); *H05B 2203/016* (2013.01)
(58) Field of Classification Search
  CPC . H05B 2203/016; F01N 3/281; F01N 3/2026; F01N 2330/02; Y02T 10/12
  See application file for complete search history.

(56) References Cited

U.S. PATENT DOCUMENTS

| | | | |
|---|---|---|---|
| 5,526,462 A | | 6/1996 | Kondo et al. |
| 5,546,746 A | | 8/1996 | Whittenberger |
| 5,571,485 A | | 11/1996 | Brunson |
| 5,670,746 A | * | 9/1997 | Hashimoto ............ H01R 13/73 422/174 |
| 6,025,578 A | * | 2/2000 | Bruck .................. F01N 3/2026 422/177 |
| 7,261,865 B2 | * | 8/2007 | Bruck .................. F01N 3/0871 422/177 |
| 9,893,505 B2 | * | 2/2018 | Brúck ..................... F01N 13/16 |
| 2015/0030509 A1 | | 1/2015 | Brueck |

FOREIGN PATENT DOCUMENTS

| | | |
|---|---|---|
| DE | 69400288 T3 | 1/1997 |
| DE | 19533088 A1 | 3/1997 |
| DE | 19921609 A1 | 11/2000 |
| DE | 102012000496 A1 | 7/2013 |
| EP | 0456919 A2 | 11/1991 |
| EP | 0490222 A1 | 6/1992 |
| EP | 0553942 A1 | 8/1993 |
| EP | 2175115 A1 | 4/2010 |
| JP | H08326526 A | 12/1996 |
| WO | 2019053250 A1 | 3/2019 |

OTHER PUBLICATIONS

Korean Office Action dated Oct. 19, 2023 for corresponding Korean Patent Application No. 10-2022-7001405.
Chinese Office Action dated Aug. 16, 2023 for corresponding Patent Application No. 202080051331.1.

* cited by examiner

ELECTRICALLY HEATABLE CATALYTIC CONVERTER

CROSS-REFERENCE TO RELATED APPLICATIONS

This application claims priority to PCT Application PCT/EP2020/072150, filed Aug. 6, 2020, which claims priority to German Patent Application No. DE 10 2019 212 133.0 filed Aug. 13, 2019. The disclosures of the above applications are incorporated herein by reference.

FIELD OF THE INVENTION

The invention relates to an electrically heatable catalytic converter with a metal honeycomb body, the honeycomb body being formed by a plurality of wound metal foils and the honeycomb body being received in a casing tube, a device for electrically contacting at least individual foils being led into the casing tube through an opening in the casing tube.

BACKGROUND OF THE INVENTION

Among the ways adopted for increasing the temperature of the exhaust gas in devices for exhaust gas aftertreatment is that of using electrically heatable honeycomb bodies. These have a honeycomb body which is formed for example from a multiplicity of metal foils which are stacked on top of one another and wound up with one another. The use of current-carrying conductors, which generate heat by utilizing the ohmic resistance, is known for heating. Alternatively, individual metal foils or stacks of layers produced from them may be electrically contacted directly, so that they act as conductors through which current flows and lead to heating.

For the purpose of electrical contacting, often a number of foils are combined at one of their free ends to form a compact stack in order to be able to direct the current into the foils in a targeted manner.

In particular in the case of electrically heatable honeycomb bodies with a large number of individual foils to be energized, it is therefore possible for particularly massive, thick stacks of foils to be produced. These have the disadvantage that on the one hand they cannot be integrated well into the honeycomb body in terms of installation space and that also they are very susceptible to the formation of hot spots, since these stacks thus formed allow the applied current to develop a possibly unfavorable current flow on the basis of the principle of least resistance. This can lead to local hot spots, which can permanently lead to damage and furthermore lead to a deterioration in the energy efficiency of the heating device.

SUMMARY OF THE INVENTION

The present invention therefore addresses the problem of creating an electrically heatable honeycomb body which allows an improved connection of individual foils to a current-introducing electrode within the honeycomb body and avoids the creation of local hot spots due to an unfavorable current flow.

The problem is solved with regard to the electrically heatable catalytic converter by an electrically heatable catalytic converter with the features described herein.

An exemplary embodiment of the invention relates to an electrically heatable catalytic converter with a metal honeycomb body, the honeycomb body being formed by a plurality of wound metal foils and the honeycomb body being received in a casing tube, a device for electrically contacting at least individual foils being led into the casing tube through an opening in the casing tube, the device being formed by an electrode which is electrically insulated from the inside of the casing tube by a connecting layer and mechanically connected to the casing tube.

The honeycomb body is formed from a plurality of metal foils, which may for example be smooth or structured, and in one embodiment are corrugated. The metal foils stacked on top of one another are then wound around one or more mandrels, so that a honeycomb body with a plurality of flow channels through which there is a flow is produced. The individual flow channels are essentially formed between the corrugated and smooth metal foils.

By spacing individual stacks of layers apart, conductors that are electrically insulated from one another are formed. By applying an electrical voltage to one or more of these stacks of layers, the honeycomb body is heated while utilizing the ohmic resistance. The stack of layers through which current flows is heated due to the electrical resistance of the metal foils forming it. Exhaust gas flowing past is also heated by the heated metal foils, which increases the temperature in the catalytic converter or in the structures following the catalytic converter.

For the purpose of electrical contacting, an electrical conductor must be led through the casing tube that receives the honeycomb body. The electrode is used for this purpose, allowing simple contacting of the metal foils In an embodiment, a material-bonding connection of the metal foils to the electrode, for example by soldering or welding, in order to produce a durable connection.

Often, one electrical pole is formed by the electrode, while the other pole is formed by the housing of the catalytic converter. In order to ensure that there is no short circuit, the electrode led through the housing or the casing must therefore be electrically insulated from the housing or the casing tube, while in one embodiment it must be connected in an electrically conductive manner to the metal foils of the stacks of layers assigned to the electrode.

To ensure durability and to increase strength, the electrode is firmly connected to the casing tube in order to avoid relative movements of the electrode with respect to the casing tube and thus also to prevent movement of the metal foils or the stacks of layers.

In an embodiment, a plurality of the metal foils forming the honeycomb body are connected to the electrode in an electrically conductive manner. This is necessary to allow a current to flow from the electrode into the metal foils.

In an embodiment, the connecting layer is formed by an insulating layer and an adhesive layer, the insulating layer facing the casing tube and the adhesive layer facing the electrode. The connecting layer is ideally a multiphase layer, which on the one hand creates electrical insulation between the casing tube and the electrode and at the same time has an adhesive layer, which allows a permanent and robust connection of the electrode to the casing tube. For example, multi-ply connecting layers or connecting layers with specific properties in the edge region are known here. Such specific properties are achieved for example by adding certain elements or mixtures of materials.

An embodiment is characterized in that the insulating layer has an electrically insulating effect and is formed from one of the materials $Al_2O_3$, $ZrO_2$, MgO, $TiO_2$, $CeO_2$, a ceramic doped with yttrium, a ceramic doped with silicon, cordierite, mullite or a mixture of the materials listed.

In an embodiment, the adhesive layer is a metal layer and is formed from one of the materials Cu, Ni, Co, Ag, Pd or their alloys, such as for example AgPd or CuNi.

In addition, in an embodiment the insulating layer and the adhesive layer have similar, or in one embodiment, the same, coefficients of thermal expansion. This avoids the occurrence of stresses within the connecting layer. Stresses may be caused by the great heating and cooling of the catalytic converter during operation. The insulating layer and the adhesive layer may also have similar or the same coefficients of thermal expansion as the adjacent casing or the electrode.

In an embodiment, the electrode is T-shaped and the section arranged in the interior of the casing tube has a larger cross-sectional area than the opening through which it is led. The T-shaped basic shape creates a connection surface for the metal foils or the stacks of layers which is larger than the opening through which the electrode is led through the casing tube. This makes the connection of the stacks of layers easier and also prevents the creation of so-called hot spots, which may result from a concentration of the flowing current at a certain point on the electrode or the metal foils.

The electrode may be led through the casing tube from the inside and then mechanically connected to the casing tube before the metal foils are finally connected to the electrode. Depending on the design of the production process, the connection of the electrode to the casing tube and the metal foils to the electrode may also be achieved at the same time in one working step, for example by soldering in a soldering furnace.

It is also expedient if the casing tube has a radially outwardly directed bulge in the region of the opening, the section of the electrode that is led into the interior of the casing tube being received in a pocket formed by this bulge. The outward bulge creates a kind of cavern on the inside in the wall of the casing tube, into which the T-shaped area of the electrode is received. As a result, the otherwise circular cross section of the casing tube may be retained. Furthermore, the honeycomb body formed from the metal foils does not have to be specially adapted in order to be adapted to the electrode. Of course, this also applies in the same way to honeycomb bodies and casing tubes with different cross sections, such as for example an oval cross section.

In addition, in an embodiment, the opening in the casing tube is closed in a gas-tight manner by the material-bonding connection between the electrode, the insulating layer and the adhesive layer. This is to avoid leaks. Exiting hot exhaust gases on the one hand remove energy from the catalytic converter and also may cause damage to the structures surrounding the catalytic converter.

Additional developments of the present invention are described in the following description of the figures.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail below on the basis of exemplary embodiments with reference to the drawings. In the drawings.

DETAILED DESCRIPTION OF THE PREFERRED EMBODIMENTS

The following description of the preferred embodiment(s) is merely exemplary in nature and is in no way intended to limit the invention, its application, or uses.

Figure 1:
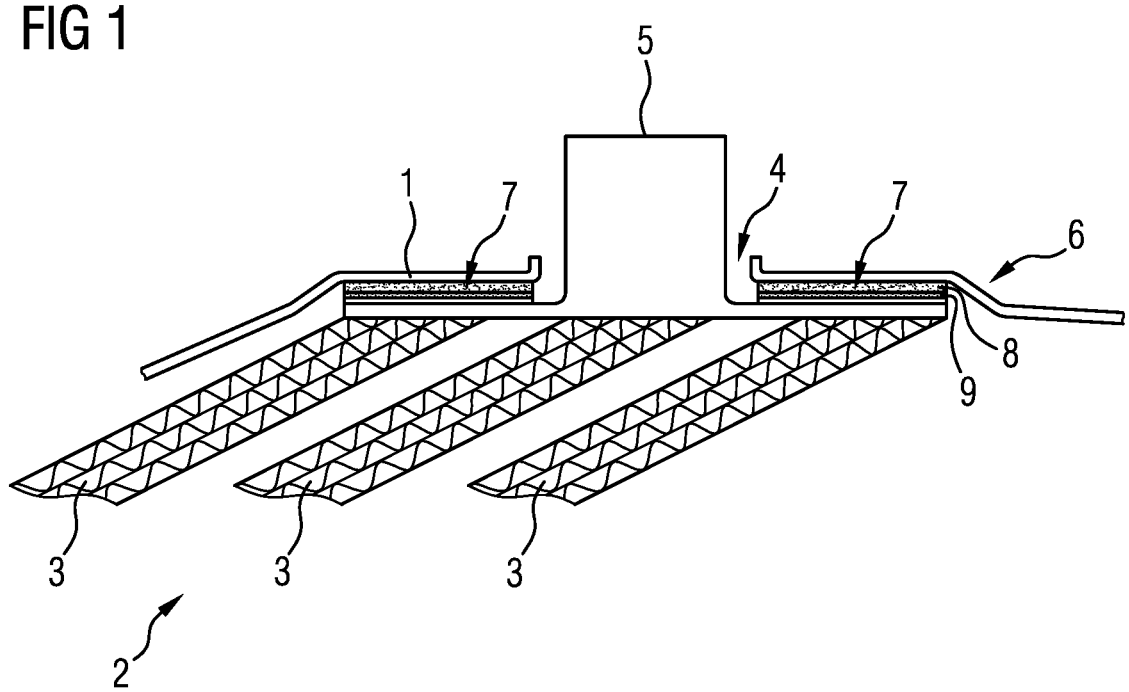
FIG. 1 shows a schematic sectional view through the electrode and the casing tube in the region of the lead-through through the casing tube.

FIG. 1 shows a sectional view through a casing tube 1 of a catalytic converter, which in this embodiment is an electrically heatable catalytic converter. The casing tube 1 forms a housing for the honeycomb body 2 formed in the interior, which is formed from a plurality of metal foils which are stacked on top of one another to form stacks of layers 3.

The casing tube 1 has an opening 4 through which an electrode 5 is led. In the exemplary embodiment of FIG. 1, the electrode 5 has a stem-like extension, which protrudes outward through the opening 4 from the interior of the casing tube 1, and a plate-shaped section, which is arranged in the interior of the casing tube 1. The electrode 5 is T-shaped.

In the direct vicinity of the opening 4, the casing tube 1 has a bulge 6, in which the plate-shaped section of the electrode 5 is received. The inwardly directed surface of the plate-shaped section of the electrode 5 is in line with the inner wall of the casing tube 1. Depending on the radius of the casing tube 1, the plate-shaped section may also be preformed and adapted to the geometry of the inside of the casing tube 1. Thus, the electrode 5 may for example also be adapted to an oval or some other cross section of the casing tube 1.

The bulge 6 has the effect that an envelope curve placed around the honeycomb body 2 formed in the interior may have a continuous profile and need not have a notch or other recess in the region of the electrode 5. Honeycomb bodies are often produced by winding the stacks of layers around a mandrel or a number of mandrels.

The electrode 5 is mechanically and temperature-resistantly connected to the casing tube 1 by way of a connecting layer 7. The connecting layer 7 has an electrically insulating region 8 and an adhesive region 9. The electrically insulating region 8 is arranged on the side facing the casing tube 1 and the adhesive region is arranged on the side of the connecting layer 7 facing the electrode 5.

A solder 10, which is used for the later connection of the electrode 5 to the casing 1, may be applied to the adhesive region 9. The connecting layer 7 may be formed from two individual, joined-together layers. Alternatively, a layer which is formed differently in each of both edge regions may also be formed. For example, the concentration of added elements may vary in strength in order to achieve an electrically insulating effect at an edge region. A sufficiently high metal content to allow the connection to the electrode 5 by soldering may be formed at the opposite edge region. Various materials are also described.

Figure 2:
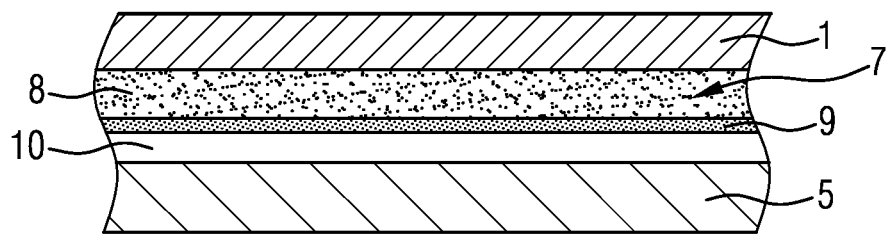
FIG. 2 shows a sectional view through the contact point between the casing tube and the electrode, the connecting layer also being shown.

The exemplary embodiment of FIGS. 1 and 2 does not have a restrictive character and serves for illustrating the concept of the invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An electrically heatable catalytic converter, comprising:
   a honeycomb body formed by a plurality of wound metal foils;
   a casing tube, the honeycomb body being received in the casing tube;
   an opening formed as part of the casing tube;
   a radially outwardly directed bulge formed as part of the casing tube, the radially outwardly directed bulge located in the region of the opening;
   a pocket formed by the radially outwardly directed bulge;
   a connecting layer, further comprising:
      an insulating layer, the insulating layer facing the casing tube;
      an adhesive layer adjacent the insulating layer, the adhesive layer and the insulating layer received in the pocket;
   a device for electrically contacting at least one of the plurality of wound metal foils, the device further comprising:
      an electrode which is mechanically connected to the casing tube and is electrically insulated from the inside of the casing tube by the connecting layer such that the adhesive layer faces the electrode;
   wherein the device is led into the casing tube through the opening in the casing tube, and a section of the electrode led into the interior of the casing tube is received in the pocket.

2. The electrically heatable catalytic converter of claim 1, wherein at least one of the plurality of wound metal foils forming the honeycomb body are electrically conductively connected to the electrode.

3. The electrically heatable catalytic converter of claim 1, the insulating layer further comprising an electrically insulating effect.

4. The electrically heatable catalytic converter of claim 3, the insulating layer being one selected from the group consisting of $Al_2O_3$, $ZrO_2$, $MgO$, $TiO_2$, $CeO_2$, a ceramic doped with yttrium, a ceramic doped with silicon, cordierite, mullite or a mixture of the materials listed.

5. The electrically heatable catalytic converter claim 1, the adhesive layer further comprising a metal layer.

6. The electrically heatable catalytic converter claim 5, the metal layer being formed from a material selected from the group consisting of Cu, Ni, Co, Ag, Pd or their alloys, such as for example AgPd or CuNi.

7. The electrically heatable catalytic converter of claim 1, wherein the insulating layer and the adhesive layer have similar coefficients of thermal expansion.

8. The electrically heatable catalytic converter of claim 1, wherein the opening in the casing tube is closed in a gas-tight manner by the material-bonding connection between the electrode, the insulating layer, and the adhesive layer.

9. The electrically heatable catalytic converter of claim 1, wherein the electrode is T-shaped and a section of the electrode arranged in the interior of the casing tube has a larger cross-sectional area than the opening.

10. The electrically heatable catalytic converter of claim 1, wherein the electrode is made in one piece.

* * * * *